United States Patent
Salter et al.

(10) Patent No.: US 9,623,797 B1
(45) Date of Patent: Apr. 18, 2017

(54) LIFT GATE LAMP

(71) Applicant: Ford Global Technologies, LLC, Dearborn, MI (US)

(72) Inventors: Stuart C. Salter, White Lake, MI (US); James J. Surman, Clinton Township, MI (US); Paul Kenneth Dellock, Northville, MI (US); Sleiman N. Abdelnour, Macomb, MI (US); Stephen Kenneth Helwig, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/015,688

(22) Filed: Feb. 4, 2016

(51) Int. Cl.
| | |
|---|---|
| *B60Q 1/00* | (2006.01) |
| *B60Q 1/26* | (2006.01) |
| *B60Q 11/00* | (2006.01) |
| *B60Q 3/02* | (2006.01) |
| *F21K 2/00* | (2006.01) |
| *F21V 7/22* | (2006.01) |
| *B60Q 3/06* | (2006.01) |
| *F21V 8/00* | (2006.01) |

(52) U.S. Cl.
CPC ............ *B60Q 3/0233* (2013.01); *B60Q 3/06* (2013.01); *F21K 2/00* (2013.01); *F21V 7/22* (2013.01); *G02B 6/0008* (2013.01)

(58) Field of Classification Search
CPC .... B60Q 3/008; B60Q 3/0216; B60Q 3/0233; B60Q 3/06; F21K 2/00; F21V 7/22; G02B 6/0008
USPC .......................... 362/487, 496, 501, 509–510
See application file for complete search history.

(56) References Cited

U.S. PATENT DOCUMENTS

| | | | |
|---|---|---|---|
| 5,709,453 | A | 1/1998 | Krent et al. |
| 6,031,511 | A | 2/2000 | DeLuca et al. |
| 6,117,362 | A | 9/2000 | Yen et al. |
| 6,364,498 | B1 | 4/2002 | Burbank |
| 6,369,395 | B1 | 4/2002 | Roessler |
| 6,494,490 | B1 | 12/2002 | Trantoul |
| 6,577,073 | B2 | 6/2003 | Shimizu et al. |
| 6,729,738 | B2 | 5/2004 | Fuwausa et al. |
| 6,737,964 | B2 | 5/2004 | Samman et al. |
| 6,773,129 | B2 | 8/2004 | Anderson, Jr. et al. |
| 6,820,888 | B1 | 11/2004 | Griffin |
| 6,851,840 | B2 | 2/2005 | Ramamurthy et al. |
| 6,859,148 | B2 | 2/2005 | Miller |
| 6,871,986 | B2 | 3/2005 | Yamanaka et al. |
| 6,953,536 | B2 | 10/2005 | Yen et al. |
| 6,990,922 | B2 | 1/2006 | Ichikawa et al. |

(Continued)

FOREIGN PATENT DOCUMENTS

| | | |
|---|---|---|
| CN | 200956232 Y | 10/2007 |
| CN | 101337492 A | 1/2009 |

(Continued)

*Primary Examiner* — Jason Moon Han
(74) *Attorney, Agent, or Firm* — Jason Rogers; Price Heneveld LLP

(57) ABSTRACT

An illumination apparatus for a vehicle is disclosed. The apparatus comprises at least one luminescent portion disposed in a cavity formed by a handle portion of a closure of the vehicle. The apparatus further comprises a panel disposed in the cavity comprising a reflective surface. The panel is configured to receive light and reflect a first light portion of the environmental light toward the luminescent portion charging a persistent luminescent material of the luminescent portion.

20 Claims, 3 Drawing Sheets

(56) References Cited

U.S. PATENT DOCUMENTS

| | | |
|---|---|---|
| 7,161,472 B2 | 1/2007 | Strumolo et al. |
| 7,213,923 B2 | 5/2007 | Liu et al. |
| 7,264,366 B2 | 9/2007 | Hulse |
| 7,264,367 B2 | 9/2007 | Hulse |
| 7,441,914 B2 | 10/2008 | Palmer et al. |
| 7,501,749 B2 | 3/2009 | Takeda et al. |
| 7,575,349 B2 | 8/2009 | Bucher et al. |
| 7,745,818 B2 | 6/2010 | Sofue et al. |
| 7,753,541 B2 | 7/2010 | Chen et al. |
| 7,834,548 B2 | 11/2010 | Jousse et al. |
| 7,862,220 B2 | 1/2011 | Cannon et al. |
| 7,987,030 B2 | 7/2011 | Flores et al. |
| 8,016,465 B2 | 9/2011 | Egerer et al. |
| 8,022,818 B2 | 9/2011 | la Tendresse et al. |
| 8,066,416 B2 | 11/2011 | Bucher |
| 8,071,988 B2 | 12/2011 | Lee et al. |
| 8,097,843 B2 | 1/2012 | Agrawal et al. |
| 8,136,425 B2 | 3/2012 | Bostick |
| 8,163,201 B2 | 4/2012 | Agrawal et al. |
| 8,178,852 B2 | 5/2012 | Kingsley et al. |
| 8,197,105 B2 | 6/2012 | Yang |
| 8,203,260 B2 | 6/2012 | Li et al. |
| 8,207,511 B2 | 6/2012 | Bortz et al. |
| 8,232,533 B2 | 7/2012 | Kingsley et al. |
| 8,247,761 B1 | 8/2012 | Agrawal et al. |
| 8,286,378 B2 | 10/2012 | Martin et al. |
| 8,408,766 B2 | 4/2013 | Wilson et al. |
| 8,415,642 B2 | 4/2013 | Kingsley et al. |
| 8,421,811 B2 | 4/2013 | Odland et al. |
| 8,466,438 B2 | 6/2013 | Lambert et al. |
| 8,519,359 B2 | 8/2013 | Kingsley et al. |
| 8,519,362 B2 | 8/2013 | Labrot et al. |
| 8,552,848 B2 | 10/2013 | Rao et al. |
| 8,606,430 B2 | 12/2013 | Seder et al. |
| 8,624,716 B2 | 1/2014 | Englander |
| 8,631,598 B2 | 1/2014 | Li et al. |
| 8,664,624 B2 | 3/2014 | Kingsley et al. |
| 8,683,722 B1 | 4/2014 | Cowan |
| 8,724,054 B2 | 5/2014 | Jones |
| 8,754,426 B2 | 6/2014 | Marx et al. |
| 8,773,012 B2 | 7/2014 | Ryu et al. |
| 8,846,184 B2 | 9/2014 | Agrawal et al. |
| 8,876,352 B2 | 11/2014 | Robbins et al. |
| 8,952,341 B2 | 2/2015 | Kingsley et al. |
| 9,006,751 B2 | 4/2015 | Kleo et al. |
| 9,018,833 B2 | 4/2015 | Lowenthal et al. |
| 9,057,021 B2 | 6/2015 | Kingsley et al. |
| 9,065,447 B2 | 6/2015 | Buttolo et al. |
| 9,187,034 B2 | 11/2015 | Tarahomi et al. |
| 9,299,887 B2 | 3/2016 | Lowenthal et al. |
| 2002/0159741 A1 | 10/2002 | Graves et al. |
| 2002/0163792 A1 | 11/2002 | Formoso |
| 2003/0167668 A1 | 9/2003 | Fuks et al. |
| 2003/0179548 A1 | 9/2003 | Becker et al. |
| 2004/0213088 A1 | 10/2004 | Fuwausa |
| 2006/0087826 A1 | 4/2006 | Anderson, Jr. |
| 2006/0097121 A1 | 5/2006 | Fugate |
| 2007/0032319 A1 | 2/2007 | Tufte |
| 2007/0285938 A1 | 12/2007 | Palmer et al. |
| 2009/0219730 A1 | 9/2009 | Syfert et al. |
| 2009/0251920 A1 | 10/2009 | Kino et al. |
| 2009/0260562 A1 | 10/2009 | Folstad et al. |
| 2009/0262515 A1 | 10/2009 | Lee et al. |
| 2011/0012062 A1 | 1/2011 | Agrawal et al. |
| 2012/0001406 A1 | 1/2012 | Paxton et al. |
| 2012/0104954 A1 | 5/2012 | Huang |
| 2012/0183677 A1 | 7/2012 | Agrawal et al. |
| 2012/0280528 A1 | 11/2012 | Dellock et al. |
| 2013/0335994 A1 | 12/2013 | Mulder et al. |
| 2014/0029281 A1 | 1/2014 | Suckling et al. |
| 2014/0065442 A1 | 3/2014 | Kingsley et al. |
| 2014/0103258 A1 | 4/2014 | Agrawal et al. |
| 2014/0264396 A1 | 9/2014 | Lowenthal et al. |
| 2014/0266666 A1 | 9/2014 | Habibi |
| 2014/0373898 A1 | 12/2014 | Rogers et al. |
| 2015/0046027 A1 | 2/2015 | Sura et al. |
| 2015/0138789 A1 | 5/2015 | Singer et al. |
| 2015/0267881 A1 | 9/2015 | Salter et al. |
| 2016/0016506 A1 | 1/2016 | Collins et al. |

FOREIGN PATENT DOCUMENTS

| | | |
|---|---|---|
| CN | 201169230 Y | 2/2009 |
| CN | 201193011 Y | 2/2009 |
| CN | 201391118 Y | 1/2010 |
| CN | 202169904 U | 3/2012 |
| CN | 202944278 U | 5/2013 |
| CN | 204127823 U | 1/2015 |
| DE | 29708699 U1 | 7/1997 |
| DE | 10319396 A1 | 11/2004 |
| EP | 1793261 A1 | 6/2007 |
| EP | 2778209 A1 | 9/2014 |
| JP | 2000159011 A | 6/2000 |
| JP | 2007238063 A | 9/2007 |
| WO | 2006047306 A1 | 5/2006 |
| WO | 2014068440 A1 | 5/2014 |

LIFT GATE LAMP

FIELD OF THE INVENTION

The present invention generally relates to vehicle lighting systems, and more particularly, to vehicle lighting systems employing photoluminescent structures.

BACKGROUND OF THE INVENTION

Illumination arising from photoluminescent materials offers a unique and attractive viewing experience. It is therefore desired to incorporate such photoluminescent materials in portions of vehicles to provide ambient and task lighting.

SUMMARY OF THE INVENTION

According to one aspect of the present invention, an illumination apparatus for a vehicle is disclosed. The apparatus comprises at least one luminescent portion disposed in a cavity formed by a handle portion of a closure of the vehicle. The apparatus further comprises a panel disposed in the cavity comprising a reflective surface. The panel is configured to receive light and reflect a first light portion of the environmental light toward the luminescent portion charging a persistent luminescent material of the luminescent portion.

According to another aspect of the present invention, a lighting device for a vehicle is disclosed. The lighting device comprises a first luminescent portion disposed in a cavity formed by a handle portion of a closure of the vehicle configured to illuminate the handle portion. The device further comprises a second luminescent portion configured to illuminate an indicator light disposed on an intermediate surface of the closure. A panel is disposed in the cavity comprising a partially reflective surface configured to transmit environmental light to each of the luminescent portions.

According to yet another aspect of the present invention, an illumination apparatus for a vehicle is disclosed. The apparatus comprises a first luminescent portion disposed in a cavity formed by a handle portion of a closure of the vehicle configured to illuminate the handle portion. The apparatus further comprises a second luminescent portion configured to illuminate an indicator light disposed on an intermediate surface of the closure. A panel is disposed in the cavity comprising a partially reflective surface configured to transmit environmental light to each of the luminescent portions.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present disclosure are disclosed herein. However, it is to be understood that the disclosed embodiments are merely exemplary of the disclosure that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present disclosure.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The following disclosure describes a lighting apparatus for a vehicle configured to illuminate at least a portion of an access portion of a closure of the vehicle. The access portion may correspond to a handle or latch mechanism of the closure. The lighting apparatus may be configured to illuminate without a conventional electrical light source. In some embodiments, the light source may be configured to derive power to illuminate the access portion from the sun and/or environmental light sources (e.g. street lights, parking lights, building lights, etc.) that may impinge upon the lighting apparatus. In this configuration, the light apparatus may provide for an energy efficient lighting assembly.

Figure 1:
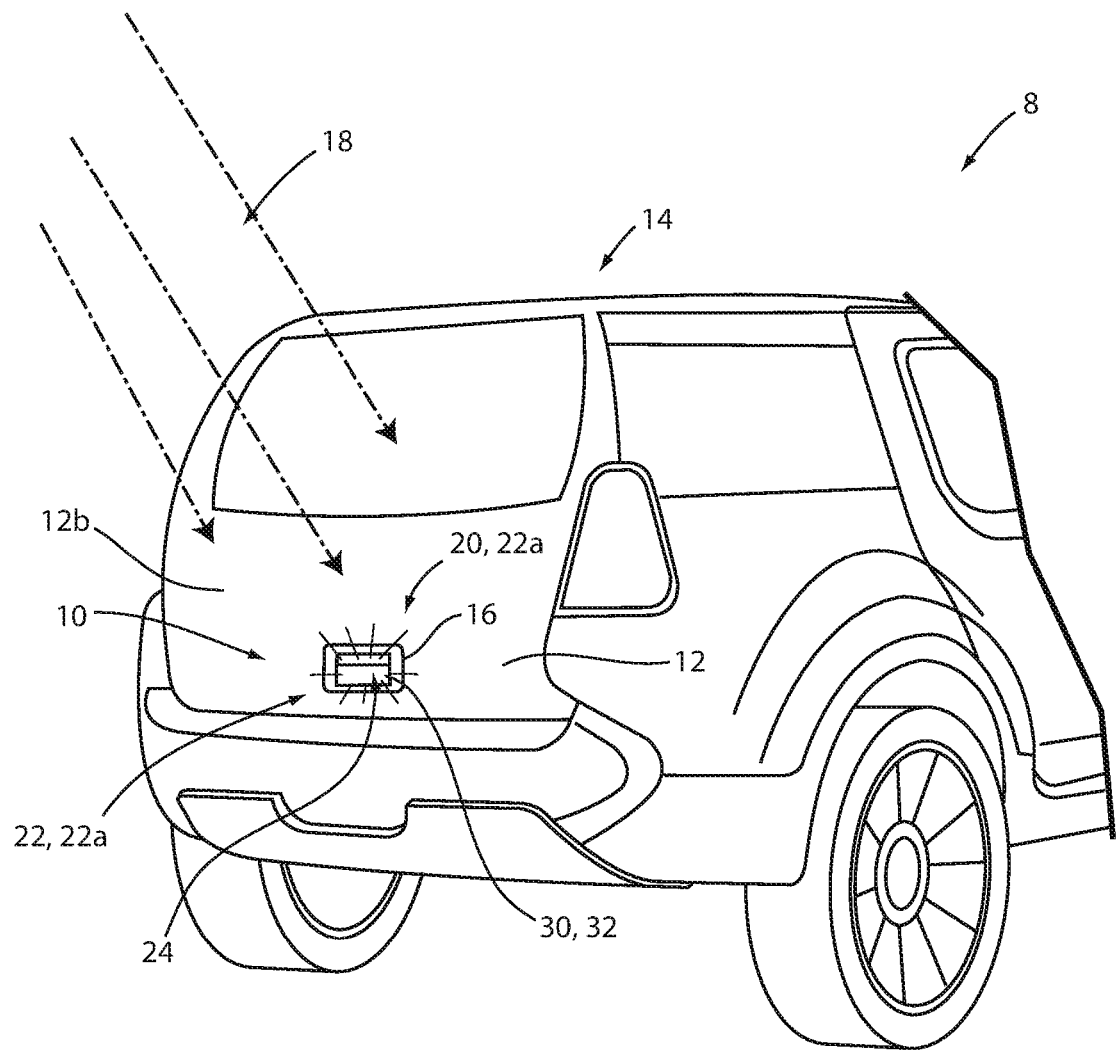
FIG. 1 is a perspective view of an automotive vehicle demonstrating a lighting apparatus.

Referring to FIG. 1, a vehicle 8 is shown comprising the lighting apparatus 10 disposed on a closure or lift gate 12. As illustrated, the lift gate 12 is shown in a closed position 14. The lighting apparatus 10 of the vehicle 8 may form a portion of a lighting apparatus 10 configured to illuminate at least a portion of a handle 16 or latch mechanism of the lift gate 12. The lighting apparatus 10 may be configured to receive environmental light 18 from a local environment proximate the vehicle 8, which may correspond to sunlight and/or light from localized light sources. In this configuration, the lighting apparatus 10 may be configured to receive and store light energy to illuminate the handle 16 for extended periods.

To facilitate the illumination of the handle portion 16, the lighting apparatus 10 may comprise at least one luminescent portion 20. The luminescent portion 20 may correspond to a persistent luminescent portion comprising one or more persistent luminescent materials. The persistent luminescent materials may be configured to utilize one or more wavelengths from the environmental light 18 to charge the at least one luminescent portion 20. In response to receiving the environmental light 18, the luminescent portion 20 may store energy via an electrochemical reaction and generate an output emission 22. The output emission 22 may correspond to one or more wavelengths of light that may be different or similar to the environmental light 18 in appearance. That is, the environmental light 18 and the output emission 22 may comprise one or more like or dissimilar wavelengths of light. While the various implementations of the lighting apparatus 10 described herein refer to specific structures demonstrated in reference to at least one automotive vehicle, it will be appreciated that the lighting apparatus 10 may be utilized in a variety of applications.

Figure 2:
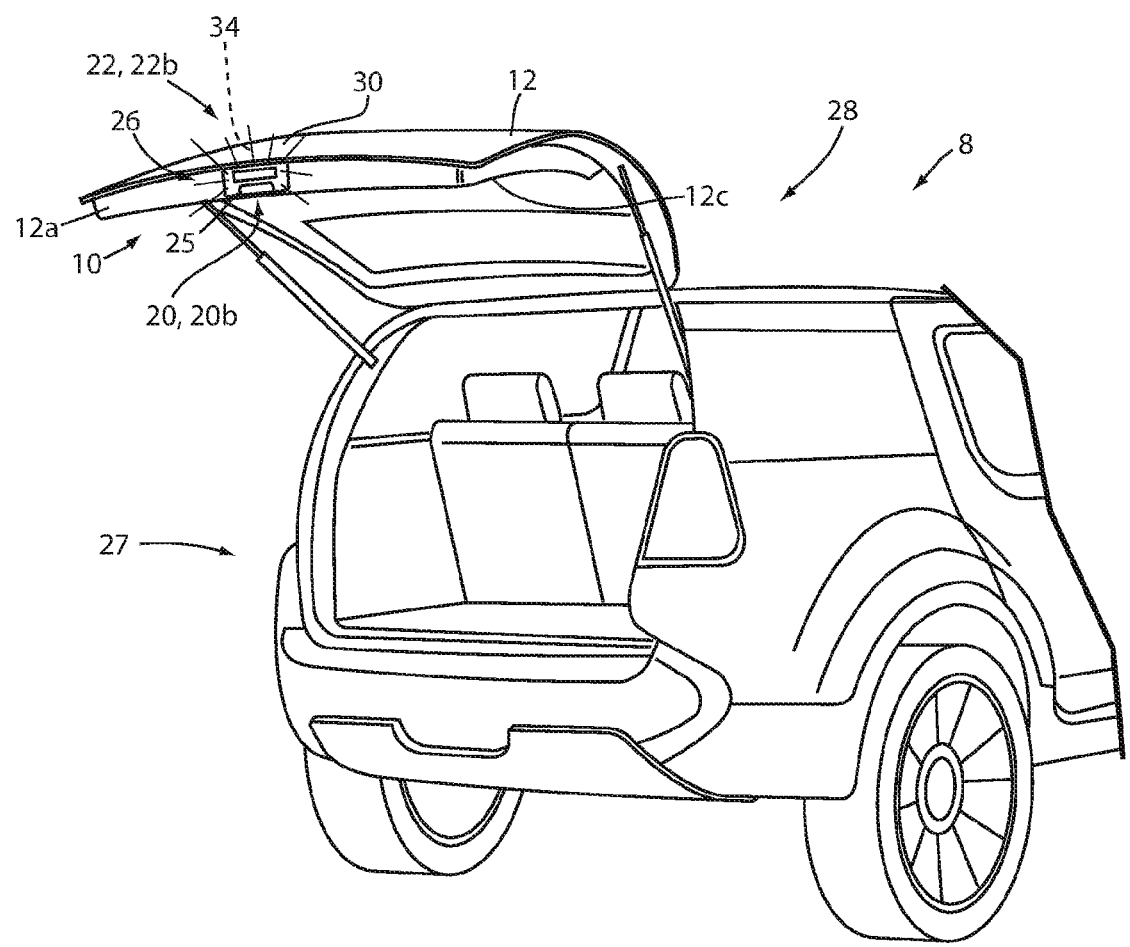
FIG. 2 is a perspective view of an automotive vehicle demonstrating a lighting apparatus.

Referring now to FIGS. 1 and 2, the luminescent portion 20 may correspond to a first luminescent portion 20a configured to output a first output emission 22a and a second luminescent portion 20b configured to output a second output emission 22b. The first luminescent portion 20a may be disposed on an internal handle surface forming at least a portion of a cavity 24 formed by the handle 16. The second luminescent portion 20b may correspond to an indicator light 26 and/or reflector. The indicator light 26 may be visible from a rear facing direction of the vehicle 8 and may be disposed on an intermediate surface 12a of the lift gate 12 or more generally of a closure. The intermediate surface 12a may be disposed between an exterior surface 12b and an interior surface 12c that may be concealed by an interface between the lift gate 12 and a body opening 27 of the vehicle 8 in response to the lift gate 12 being arranged in the closed position 14.

When the lift gate 12 is arranged in the closed position 14, as illustrated in FIG. 1, the intermediate surface 12b may be concealed such that indicator light 26 is effectively turned off. When the lift gate 12 is arranged in an open position 28, as illustrated in FIG. 2, the intermediate surface 12a may be visible providing an effective activation of the indicator light 26. In this configuration, the lighting apparatus 10 may provide multiple illumination functions including illuminating the handle 16 when the lift gate 12 is arranged in the closed position 14 and/or the indicator light 26 when the lift gate 12 is arranged in the open position 28. Additionally, the lighting apparatus 10 may provide such lighting without utilizing electricity from the vehicle 8.

The lighting apparatus 10 may capture the environmental light 18 via a light absorption structure 30, which may comprise an at least partially reflective surface 32 configured to reflect the environmental light up toward the first luminescent portion 20a. The light absorption structure 30 may further comprise at least one optical light guide 34, which may be configured to transmit at least a portion of the environmental light from the reflective surface 32 to the second luminescent portion 20b. In this configuration, the light absorption structure 30 of the lighting apparatus 10 may provide for the first luminescent portion 20a and the second luminescent portion 20b to be charged by the environmental light 18. Further details describing light absorption structure 30 and the lighting apparatus are later discussed in reference to FIG. 3.

In some embodiments, the first output emission 22a and/or the second output emission 22b may correspond to a plurality of wavelengths. Each of the plurality of wavelengths may correspond to significantly different spectral color ranges. For example, the first output emission 22a may correspond to a plurality of wavelengths configured to generate a first output color. The second output emission 22b may correspond to a plurality of wavelengths configured to generate a second output color. In some implementations, a plurality of wavelengths may be combined in the output emissions 22a and/or 22b to appear as substantially white light. The plurality of wavelengths may be generated by a red-emitting luminescent material having a wavelength of approximately 620-750 nm, a green emitting luminescent material having a wavelength of approximately 526-606 nm, and a blue or blue green emitting luminescent material having a wavelength of approximately 400-525 nm.

The persistent luminescent materials as discussed herein may correspond to phosphorescent materials. Persistent luminescent materials may correspond to alkaline earth aluminates and silicates, for example doped (di)silicates. Such substances may incorporate persistent luminescent phosphors or other doped compounds. Persistent luminescent substances may be doped with one or more ions, which may correspond to rare earth elements, for example: $Eu^{2+}$, $Tb^{3+}$, $Dy^{3+}$, and $R^{3+}$. Persistent luminescent materials may be defined as being operable to carry a charge and discharge light for a period of several minutes. For example, persistent luminescent materials as described herein may have an afterglow decay time longer than several minutes. The decay time may be defined as the time between the end of the excitation and the moment when the light intensity of the photoluminescent material drops below a minimum visibility of 0.32 mcd/m$^2$. The minimum visibility is roughly 100 times the sensitivity of the dark-adapted human eye, which corresponds to a definition used in the safety signage and by various researchers of luminescent properties.

A persistent luminescent material as discussed herein may be operable to emit light at an intensity of 0.32 mcd/m$^2$ after a decay time of 10 minutes. In an exemplary embodiment, a persistent luminescent material may be operable to emit light at an intensity of 0.32 mcd/m$^2$ after a decay time of 30 minutes and in some embodiments for a period longer than 60 minutes. In an exemplary embodiment, a persistent luminescent material may have a luminance ratio of greater than or equal to 20% of a first intensity after 10 minutes of decay time relative to a second intensity after 30 minutes of decay time. Additionally, in some embodiments, a persistent luminescent material may have a luminance ratio of greater than or equal to 10% of a first intensity after 10 minutes of decay time relative to a second intensity after 60 minutes of decay time.

As discussed herein, persistent luminescent materials may be operable to store energy received from an activation emission or a corresponding wavelength. The stored energy may then be emitted from the persistent luminescent material for a wide range of times, some extending up to approximately 24 hours. Such materials, when utilized in the luminescent portions 20 discussed herein make it possible to sustain light from the luminescent portions by charging the luminescent portions 20 via the environmental light. Accordingly, the luminescent portions 20 may be configured to sustain a charge and emit the output emissions 22 for extended periods, such as a period corresponding to nighttime when environmental light 18 may be less abundant. In this configuration, the luminescent portions 20 may be configured to provide a substantially consistent ambient illumination of the luminescent portions 20 of the vehicle 8.

In some embodiments, the luminescent materials discussed herein may correspond to organic or inorganic fluorescent dyes configured to convert the environmental light 18 and generate the output emissions 20. For example, a luminescent material may comprise a photoluminescent structure of rylenes, xanthenes, porphyrins, phthalocyanines, or other materials suited to a particular Stokes shifts defined by an absorption range and an emission fluorescence. In some embodiments, luminescent materials may be of at least one inorganic luminescent material selected from the group of phosphors. The inorganic luminescent material may more particularly be from the group of Ce-doped garnets, such as YAG:Ce. As such, each of the luminescent portions 20 may be selectively activated by a wide range of wavelengths received from the environmental light configured to excite one or more photoluminescent materials to emit an output emission having a desired color.

As discussed herein, each of the luminescent portions 20 may comprise one or more photoluminescent and/or persistent luminescent materials. The luminescent portions as described herein may be applied to various portions of the closures of the vehicle 8, which may correspond to surfaces that may be impinged upon by the environmental light 18 as described herein. Additional information regarding the construction of luminescent structures that may be utilized in a vehicle is disclosed in U.S. Pat. No. 8,232,533 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," filed Jul. 31, 2012, the entire disclosure of which is incorporated herein by reference.

Figure 3:
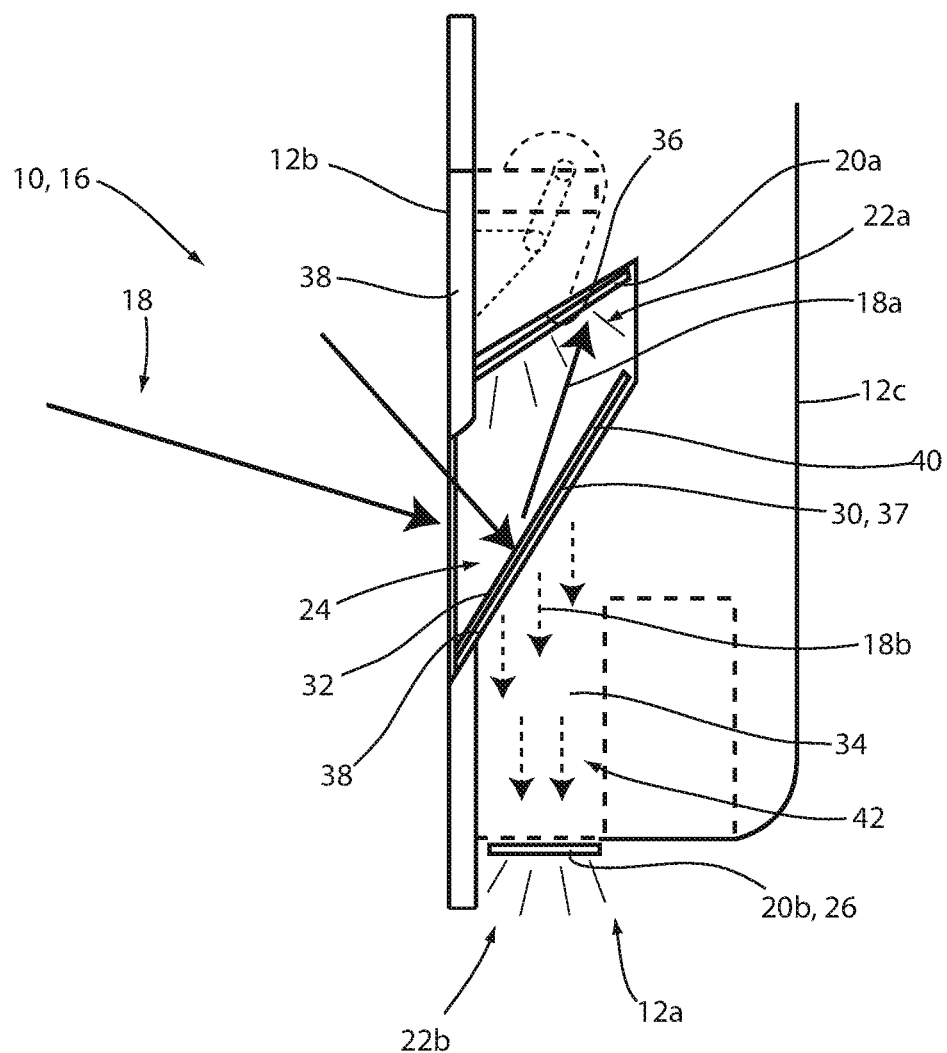
FIG. 3 is a side cross-sectional view of a lighting apparatus comprising at least one luminescent portion comprising a persistent luminescent material in accordance with the disclosure.

Referring now to FIG. 3, a cross-sectional view of the lighting apparatus 10 is shown. The environmental light 18 is shown entering the cavity 24 and at least partially reflecting from the partially reflective surface 32. The surface 32 may be configured to reflect a first light portion 18a of the light energy from the environmental light 18 upward to the internal handle surface 36 forming at least a portion of the cavity 24. Additionally, the reflective surface 32 may be configured to absorb a second light portion 18b of the environmental light 18 such that the light energy is received by the optical light guide 34. In this configuration, the first light portion 18a may be reflected to the first luminescent portion 20a, and the second light portion 18b may be absorbed by the at least partially reflective surface 32 and transmitted into the optical light guide 34 for transmission to the second luminescent portion 20b.

In an exemplary embodiment, the environmental light 18 may be received substantially during daylight hours and/or when the vehicle is located in a well-lit area providing wavelengths of light configured to charge the luminescent portions 20. Under such conditions, the environmental light 18 may be received by the first luminescent portion 20a and the second luminescent portion 20b as the first light portion 18a and the second light portion 18b respectively. Accordingly, the persistent luminescent material disposed in and/or forming at least a portion of each of the luminescent portions 20 may be charged by the environmental light 18. The charge may result in the first luminescent portion 20a and the second luminescent portion 20b emitting the first output emission 22a and the second output emission 22b respectively for extended periods of time when the environmental light 18 is unavailable. In this way, the disclosure provides for a passive light source configured to illuminate the handle 16 and the indicator light 26. As described herein, the term passive light source may correspond to an apparatus operable to emit visible light without the requirement of a conventional electrically powered light source.

The internal handle surface 36 may be hidden from a typical view of an onlooker to provide for a hidden light source, which is at least partially concealed within the cavity 24 formed by the handle 16. The first luminescent portion 20a may be concealed within the cavity 24 such that an outer panel 38 conceals the first luminescent portion 20a from outside the cavity 24. In this configuration, the reflective surface 32 may be configured to reflect the first light portion 18a around the outer panel 38. The outer panel 38 may conceal the first luminescent portion 20a by extending outward from proximate the upper surface, which may correspond to the internal handle surface 36. The outer panel 38 may correspond to an exterior trim panel of the handle 16 and be configured to extend outward into the cavity 24. In this configuration, the outer panel may at least partially conceal the first luminescent portion 20a from a view originating outside the cavity 24.

The reflective surface 32 may correspond to a layer or panel disposed in the cavity 24 on a lower surface 37 at least partially concealing the optical light guide 34. The reflective surface 32 may be formed on a panel 40 of an at least partially light transmissive material, which may correspond to a polymeric material (e.g. acrylic, polycarbonate, etc.). The reflective surface 32 may be formed as an at least partially vacuum metalized layer formed as a thin film coating of zinc, aluminum or a number of suitable metallic or reflective substances. In this configuration, the reflective surface 32 may provide for the environmental light 18 to be received by the first luminescent portion 20a and also provide for the first output emission 22a to be disbursed from the first luminescent portion 20a to illuminate the cavity 24 formed by the handle 16.

The second light portion 18b may be transmitted through the panel 40 and into the optical light guide 34. The optical light guide 34 may pass through an internal passage 42 formed by one or more panels, structural components, or mechanisms of the lift gate 12 or any closure of the vehicle 8. In this configuration, the optical light guide 34 may receive the second light portion 18b from the panel 40 and transmit the light energy of the second light portion 18b to the second luminescent portion 20b. The light energy from the second light portion 18b may be absorbed by the second luminescent portion 20b to charge the persistent luminescent material and provide for the generation of the second output emission 22b.

The optical light guide 34 as described herein may correspond to a light diffusing fiber, for example a glass or polymeric optical fiber. The optical fiber may be substantially transparent and configured to bend or formed to conform to various shapes or profiles of the internal passage 42. In this way, the optical fiber may be configured to transmit the light energy of the second light portion 18b from the panel 40 to the second luminescent portion 20b such that the second luminescent portion 20b may be charged substantially uniformly. The uniform delivery of the light energy may provide for the second luminescent portion 20b to be charged substantially uniformly and provide for the second output emission 22b to sustain the lighting of the indicator light 26.

As previously discussed, the lighting apparatus 10 may capture the environmental light 18 via a light absorption structure 30, which comprises the at least partially reflective surface 32. The partially reflective surface 32 is configured to reflect the first portion 18a of the environmental light 18 up toward the first luminescent portion 20a and transmit the second portion 18b of the environmental light 18 to the second luminescent portion 20b. The delivery of the environmental light 18 to the luminescent portions 20 by the lighting apparatus 10 may provide for efficient charging of the luminescent portions 20 while also providing the luminescent portions to be concealed and/or integrated on the vehicle 8.

For the purposes of describing and defining the present teachings, it is noted that the terms "substantially" and "approximately" are utilized herein to represent the inherent degree of uncertainty that may be attributed to any quantitative comparison, value, measurement, or other representation. The term "substantially" and "approximately" are also utilized herein to represent the degree by which a quantitative representation may vary from a stated reference without resulting in a change in the basic function of the subject matter at issue.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. An illumination apparatus for a vehicle comprising:
   at least one luminescent portion disposed in a cavity formed by a handle portion of a rear closure of the vehicle; and
   a panel disposed in the cavity comprising a reflective surface, wherein the panel is configure to receive sunlight and reflect a first light portion toward the luminescent portion thereby charging a persistent luminescent material of the luminescent portion.

2. The illumination apparatus according to claim 1, wherein the at least one luminescent portion is disposed on an upper surface of the handle portion within the cavity.

3. The illumination apparatus according to claim 2, further comprising an outer panel, wherein the at least one luminescent portion is at least partially concealed within the cavity by the outer panel.

4. The illumination apparatus according to claim 3, wherein the reflective portion is configured to reflect the first light portion into the cavity around the outer panel.

5. The illumination apparatus according to claim 3, wherein the outer panel extends outward from the upper surface into an opening of the cavity.

6. The illumination apparatus according to claim 1, wherein the at least one luminescent portion comprises a first luminescent portion and a second luminescent portion.

7. The illumination apparatus according to claim 6, wherein the reflective surface is partially light transmissive and configured to absorb a second light portion.

8. The illumination apparatus according to claim 7, wherein the panel is of an at least partially light transmissive material configured to transmit the second light portion therethrough toward the second luminescent portion.

9. The illumination apparatus according to claim 8, further comprising a light guide configured to receive the second light portion and transmit the second light portion through an internal passage formed by the closure to the second luminescent portion.

10. A lighting device for a vehicle comprising:
    a first luminescent portion disposed in a cavity formed by a handle portion of a closure of the vehicle configured to illuminate the handle portion;
    a second luminescent portion configured to illuminate an indicator light disposed on an intermediate surface of the closure; and
    a panel disposed in the cavity comprising a partially reflective surface configured to transmit environmental light to each of the luminescent portions.

11. The lighting device according to claim 10, wherein the panel is configured to receive the environmental light and reflect a first light portion toward the first luminescent portion.

12. The lighting device according to claim 11, wherein the panel is further configured to receive the environmental light and transmit a second light portion therethrough toward the second luminescent portion.

13. The lighting device according to claim 12, wherein the luminescent portions comprise a persistent luminescent material configured to charge in response to receiving the environmental light.

14. The lighting device according to claim 10, wherein the intermediate surface is concealed from view by an interface between the closure and a body opening of the vehicle in response to the closure arranged in a closed position.

15. The lighting device according to claim 10, further comprising a reflective portion disposed on the panel, the reflective portion configured to reflect the first light portion of the environmental light to the first luminescent portion.

16. The lighting device according to claim 10, further comprising a light guide configured to receive the second light portion from the panel and transmit the second light portion through an internal passage formed by the closure to the second luminescent portion.

17. The lighting device according to claim 10, wherein the closure corresponds to a lift gate of the vehicle.

18. An illumination apparatus for a vehicle comprising:
    a first luminescent portion disposed in a cavity formed by a handle portion of a closure of the vehicle configured to illuminate the handle portion;
    a second luminescent portion configured to illuminate an indicator light disposed on an intermediate surface of the closure; and
    a panel disposed in the cavity comprising a partially reflective surface configured to transmit environmental light to each of the luminescent portions.

19. The illumination apparatus according to claim 18, wherein the first luminescent portion comprises a first persistent luminescent material configured to emit a first output emission of light in a first color.

20. The illumination apparatus according to claim 19, wherein the second luminescent portion comprises a second persistent luminescent material configured to emit a second output emission of light in a second color different from the first color.

* * * * *